(12) United States Patent
Carter et al.

(10) Patent No.: US 10,024,014 B1
(45) Date of Patent: Jul. 17, 2018

(54) NONFLOATING OIL FENCE BOOM

(71) Applicants: David Anton Carter, Kaneohe, HI (US); Kenny Carter Sokolowski, Black Hawk, CO (US)

(72) Inventors: David Anton Carter, Kaneohe, HI (US); Kenny Carter Sokolowski, Black Hawk, CO (US)

( * ) Notice: Subject to any disclaimer, the term of this patent is extended or adjusted under 35 U.S.C. 154(b) by 0 days.

(21) Appl. No.: 15/657,071

(22) Filed: Jul. 21, 2017

(51) Int. Cl.
*E02B 15/00* (2006.01)
*E02B 15/08* (2006.01)

(52) U.S. Cl.
CPC .............. *E02B 15/0814* (2013.01)

(58) Field of Classification Search
CPC .................................... E02B 15/0814
USPC ..................................... 405/60–72
See application file for complete search history.

(56) References Cited

U.S. PATENT DOCUMENTS

| 4,252,461 | A | * | 2/1981 | Colamussi | E02L 37/005 405/115 |
| 5,688,075 | A | * | 11/1997 | Gradek | E02B 15/06 210/242.3 |
| 5,984,577 | A | * | 11/1999 | Strong | E02B 3/108 405/114 |
| 6,743,367 | B2 | * | 6/2004 | Dreyer | E02B 15/08 210/170.05 |
| 2001/0048851 | A1 | * | 12/2001 | Dreyer | E02B 15/08 405/63 |

* cited by examiner

*Primary Examiner* — Tara Mayo-Pinnock (57) ABSTRACT

A Nonfloating Oil Fence Boom is disclosed for containing heavy or sinking oils which migrate on an underwater floor. The Non-Floating Oil (NFO) Fence Boom is comprised of a vertical section, a horizontal section that abuts an underwater floor, a buoyant section and a ballast section. The ballast causes the horizontal section to sink and form a seal with the underwater floor, the buoyant section in engineered to provide only enough buoyant force to maintain the vertical section in an upright perpendicular position while not breaking the horizontal sections seal with the underwater floor thus preventing heavy oils from passing below or beyond the fence.

9 Claims, 5 Drawing Sheets

NONFLOATING OIL FENCE BOOM

BACKGROUND AND PRIOR ART

There exists certain heavy oils such as Diluted bitumen (dilbit), some Fuel Oils, and Asphalt among others, which are separately classified by the US Coast Guard and the Spill Response Community as "Nonfloating", Group V, or Sinking Oils due to the specific characteristic that they often sink in water. Weathering and other environmental conditions can cause many lighter oils to degrade, lose the lighter components and submerge as well. Traditional and current oil spill containment and protection techniques have been focused on floating oil—the oil that you can see. Using floating booms, responders have met with considerable success in containing, directing, and removing spilled oil on rivers; coastlines, and seaways. Used in a protection mode, these floating booms have been highly effective in defending ecologically and/or economically valuable and sensitive areas. These containment and protection booms have become the response community's most effective tool in containing and mitigating the damaging effects of floating oil spills but have been useless in impeding, recovering, or directing the migration of the heavier, sinking oils.

There has been much work in the art of oil containment booms, all of which though are purely designed to float on top of the water to contain and/or collect oil that is floating upon the surface of the water. These past inventions use highly flexible but impermeable fabrics like urethane and PVC coated nylon or poly scrim fabrics together with adsorbent or absorbent materials to contain and collect floating oil. These past inventions lack the ability to contain heavy oils in deep waters due to their inability to create and maintain an oil impermeable seal with the underwater floor.

Some variations of floating ballasted fencing has been used to attempt to seal against the seafloor, but the fence geometry of such devices extends from the water surface to the underwater floor thus causing huge tidal and current forces to be applied against the fence. These hanging fences are subject to tidal flow, wave propagation and/or river currents due to the positioning of their buoy system which allow them to lift and sway thus failing to create an impenetrable underwater floor seal. The present invention overcomes this shortcoming.

Other mobile fencing mechanisms have been used to fully prevent silt or fluid from passing—acting as flood barriers, dams, silt screens or the like. These past inventions use traditional dry land engineered fencing support structures to build and maintain the barrier prior to flooding,. Additionally some of these past inventions have used dredged holes that the fabric is buried in to create a seal prior to water flowing toward the fence. These past inventions lack the ability to be easily installed and removed on an underwater floor.

SUMMARY OF THE INVENTION

The invention proposed here is a Nonfloating Oil Containment and Protection Boom, hereafter to be called NFO Fence Boom, which overcomes the past inventions shortcomings and provides a solution to properly contain migrating "Nonfloating", group V, or sinking oils. As with floating containment booms, responders can use NFO Fence Booms to contain spilled oil in a proximate location, and prevent migration of submerged oil from impacting nearby sensitive environments or other commercial interests. In a scenario where submerged oil is migrating, as in rivers or harbor channels or along a coastal current, NFO Fence Booms can be placed to protect sensitive areas and deflect the oil into planned recovery locations. As with floating booms, this allows responders to use currents and the intrinsic heavy oil properties to aid in the spilled oil recovery and in protecting valued ecological and commercial assets.

The NFO Fence Boom is designed to provide an effective seal with the seabed and a barrier to contain and redirect submerged oil for concentration and recovery. NFO Fence Booms are made using highly flexible but impermeable fabrics like the urethane and PVC coated nylon or poly scrim fabrics used in the manufacture of floating containment booms. Portions of the NFO Fence boom can also contain or be composed of adsorbent or absorbent water permeable materials to aide in the containment of spills and continuously work in heavy current flow situations.

The NFO Fence Boom works in two planes to contain and redirect submerged oil. A horizontal section ballasted by chain pockets hugs the contours of the underwater floor and can be tucked into sand or rubble to limit oil seep under the boom. Grommet holes along the chain ballast pockets allow the boom to accommodate stakes driven into the underwater floor for additional anchoring security. A vertical section is joined to the horizontal section with an impermeable seam at a main chain ballast pocket. The vertical section has a buoyant section which causes only enough buoyancy to suspend the vertical section in an upright position and not raise the ballasted chain pockets or horizontal section from the seafloor during operation. The horizontal section extends at least from the main chain ballast pocket to a leading edge having a second chain ballast pocket, the leading edge being the closest part of the NFO fence boom to the heavy oil that is to be contained. The two chain ballast pockets specific horizontal configuration allows an impermeable seal to the underwater floor, thus submerged heavy oil is caught above the horizontal section and in the suspended vertical section while non-contaminated water can move easily over top of the NFO Fence Boom.

The dimensions of the horizontal section and vertical section can vary depending on the local underwater geography but one and a half to two meters coated fabrics in each of the vertical and horizontal planes is a good median dimension. NFO Fence Booms can be diver-deployed in ten—twenty meter sections that can be placed individually in overlapping chevron patterns to direct submerged oil flow or can be linked together to form a continuous subsea barrier to isolate and contain sunken oil at docks, berths, river sections, or other vessel grounding, wreck or pipeline break locations.

The linking mechanisms are well known in the art and can be composed of snaps, hook and loop fasteners, overlapping clamps, zippers, tied grommets, heat sealing, adhesives, or any combination thereof. In a preferred embodiment overlapping sections containing grommets on linking sides of a NFO Fence boom section are both folded toward the leading edge and then zip tied or tied together.

Furthermore, the horizontal section can extend from the main chain ballast pocket away from the leading edge, thus creating a tail edge that can comprise grommet holes or other well known structures to accept stakes and/or can be buried with sand, rocks or rubble to additionally secure the NFO Fence Boom in its stable underwater position. It is within the scope of the invention that the vertical section and horizontal section from the main chain ballast pocket to the leading edge are a single continuous sheet of fabric thus maximizing linked section sealing capabilities.

Additionally, NFO Fence Booms can be deployed by a boat in much longer sections to expedite deployment and recovery for large spill containment. The overall structure and support for the NFO Fence Boom is identical for either type of deployment and contain the same inventive concept. That inventive concept being a mobile fully submerged NFO fence boom structure that works in two planes to contain and redirect heavy or sinking oils along the underwater floor. The buoyant section allows only enough buoyant force to maintain the vertical section in an upright perpendicular position while maintaining the horizontal sections seal against the underwater floor. The entirety of the NFO Fence Boom being submerged underwater thus allowing tidal flow and current flow to pass over the NFO Fence Boom while trapping heavy sunken oil. It It is within the scope of the present invention to use pneumatic hoses to fill the buoyant section to a proper buoyancy appropriate to the depth of installation and to maintain the NFO fence booms vertical and horizontal sections proper perpendicular alignment and underwater seal. It is in the scope of the present invention to use buoys with pre-calculated diameters in the buoyant section to cause such proper buoyancy for the depth and/or density of the local water and specific size of the NFO fence boom, thus allowing variation for salt and fresh water spills. Such buoys can be formed of PVC, foam, or any non-collapsible tube formed of material commonly used in the art. These characteristics provide for ease in installation and a secure seal at the seabed. Additionally the chain ballasts used can be linked together between sections thus providing a sturdy continuous chain to accept the forces required when deploying and/or retrieving the NFO Fence Boom.

Additional straps can be used between the vertical section and horizontal section, or between the vertical section and the underwater floor to maintain the vertical sections stable upright configuration when positioned at locations with heavy flow. These straps can also be used to bind the top end of the vertical section to the leading edge of the horizontal section in a folded manner to allow easier handling during deployment and/or retrieval. Furthermore stiffening elements can be positioned every few feet or as desired on the horizontal section between the main chain ballast pocket and the second chain ballast pocket or along the vertical section from the bottom end to a top end. The stiffening elements can be a few mm thick piece of plastic or other torsional and longitudinally rigid material a couple inches wide that extends the entire length of the horizontal section, or any portion of the horizontal or vertical section deemed necessary for varying floor geometries. The stiffeners aid in maintaining the chain ballast pockets separation from each other and prevent twisting of the horizontal section as the NFO Fence Boom is sinking to the underwater floor during deployment. This allows for optimal speed while setting the NFO Fence Boom in its stable sealed upright configuration.

The present invention will be disclosed in a detailed description below, the Drawings and words used to describe the invention below are not limiting and only used to explain the inventive concept in great detail with additional features and embodiments that are not necessary for every NFO Fence Boom installation location.

DETAILED DESCRIPTION OF THE PREFERED EMBODIMENTS

Figure 1:
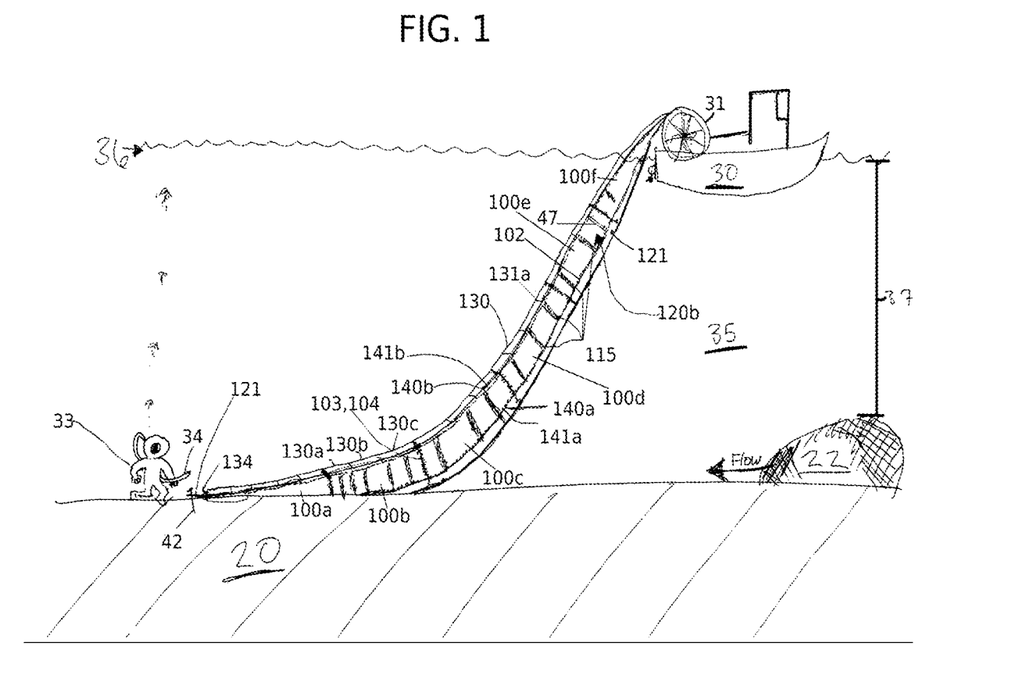
FIG. 1 shows the NFO Fence Boom in its natural habitat, linked together beneath the surface of a body of water and abutting the underwater seafloor in the migrating path of a large bath of heavy sunken oil.

Referring to FIG. 1, a NFO Fence Boom 100 is shown with linked NFO Fence Boom sections 100a-f. The NFO Fence boom 100 can be deployed into water 35 via the boat 30 off a spool 31 and/or with aid from a diver 33 in a flow path of a migrating heavy or sunken oil 22 which flows on an underwater floor 20. The heavy oil 22 is at a depth 37 beneath a surface 36 of the water 35.

Figure 2:
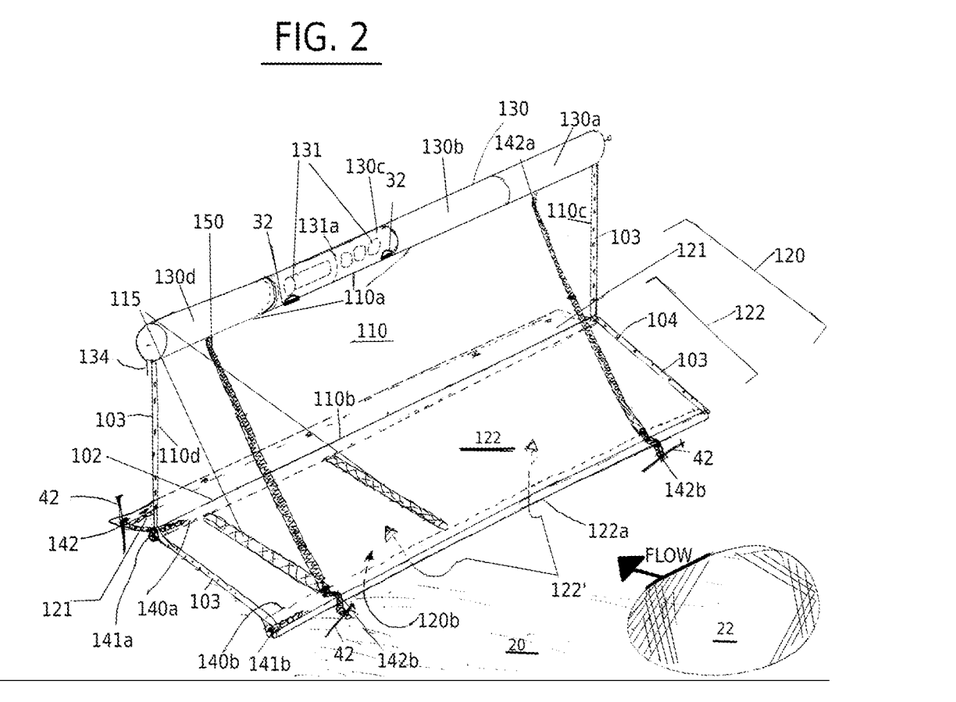
FIG. 2 shows a 3D perspective view of the NFO Fence Booms two plane containing sealed barrier in complete detail.

Referring now to FIG. 2, the NFO Fence Boom section 100 is comprised of a vertical section 110, a horizontal section 120 and a buoyant section 130. The vertical section 110 and horizontal section 120 are preferably composed of an impermeable poly coated fabric such as urethane or PVC coated nylon. The horizontal section 120 is comprised of a leading section 122 and a tail edge 121. A main chain ballast pocket 140a is located at a bottom end 110b of vertical section 110. The horizontal section 120 is impermeably sealed at a joint 102 to the vertical section 110 via heat welding. In an alternate embodiment the vertical section 110 and the leading section 122 are a continuous length of fabric and the tail edge 121 is impermeably sealed at joint 102 to the main chain ballast pocket 140a.

The leading section 122 has a leading edge 122a where a second chain ballast pocket 140b is located. The chain ballast pockets 140a-b contain a main chain ballast 141a and a second chain ballast 141b. The chain ballast pockets 140a-b are formed by folding said poly coated fabric back onto itself and then heat welding or sewing the fold thus creating the pockets as is commonly done in the art. A common form of heat welding is radiofrequency welding and can be used to fabricate such pockets. The fabrics used in the vertical section 110 and horizontal section 120 are preferably impermeable fabrics such as polyurethane, or PVC coated nylons, additional types of fabrics that are also absorbent or adsorbent may be used, such fabrics are commonly known in the art.

The buoyant section 130 can have multiple buoy pockets 130a-d which are formed in the vertical section 110 using the same folding method as the chain ballast pockets 140a-b and can be separated by sewing or heat welding at areas 131a as needed. Each pocket has either a slit 32 or an air inlet hole 134 that allows inflation of each buoy pocket 130a-d individually, or the entire buoyant section 130 can be inflated and deflated as a whole. Additionally a prefabricated buoy 131 can be integrally sealed into the buoyant section 130a-d during manufacture, in such cases it may be desirable to only secure the buoys 131 into the pockets 130a-d without completely sealing the pocket 130a-d thus allowing water seepage to evacuate the buoy pockets 130a-d upon retrieval of the NFO Fence Boom. The buoyant section 130 is engineered to create only enough buoyancy to maintain the vertical section 110 in an upright perpendicular position 13, and not lift the horizontal section 120, this is referred to as a proper buoyant force. This preferably can be accomplished on site by divers 33 using pneumatic hoses 34 and air inlet holes 134 to fill the buoy pockets 130a-d with air, the expanded volume of the buoy pockets 130a-d are manufactured to supply a proper volume of air to maintain a proper buoyant force. It is also within the scope of the invention to use prefabricated incompressible buoys 131 of a proper volume which supplies the proper buoyant force. The proper volume is pre-calculated at manufacture depending on the specific materials used, and more specifically depending on the mass and volume of the fabric, chain and/or buoys used for the entire vertical section 110, main chain ballast 141a, and buoyant section 130 which, overall, cause a sinking force on the vertical section 110 that allows the horizontal section 120 to abut the underwater floor 20.

Figure 3A:
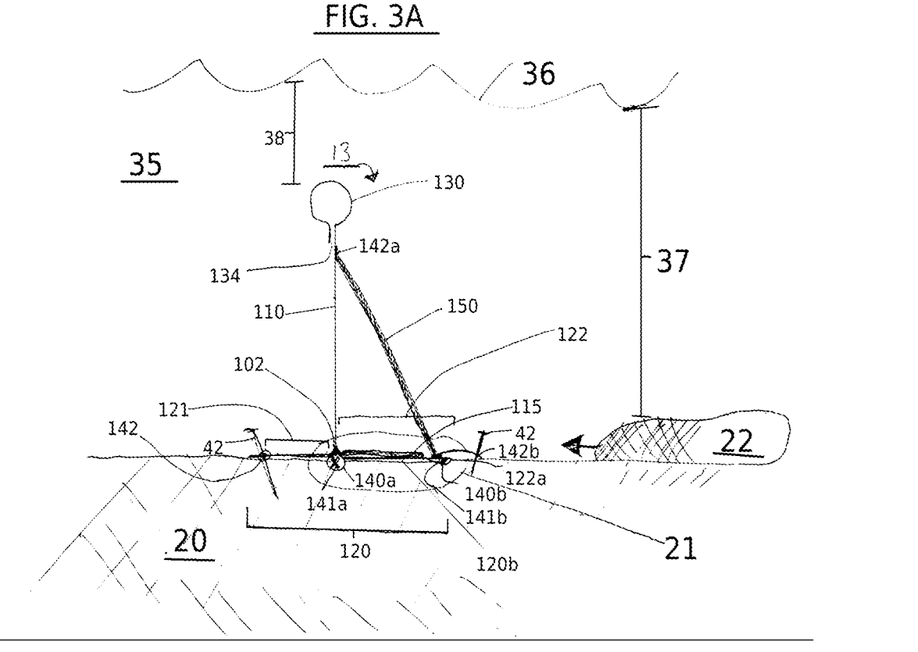
FIG. 3a shows a side view of the NFO Fence Boom while in an upright perpendicular position on the underwater floor.
Figure 4:
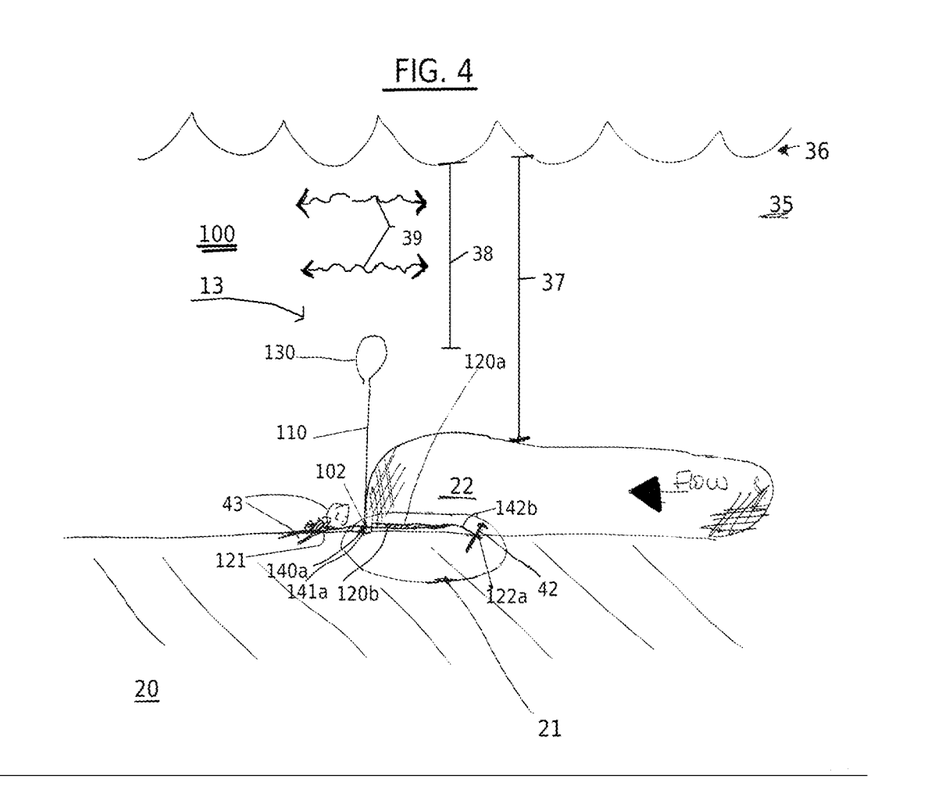
FIG. 4 shows the NFO Fence boom in use where the sunken oils are actively contained by the NFO Fence Boom and the uncontaminated water is able to pass unrestricted above the buoyant section.

In a preferred embodiment a sinking force to proper buoyant force ratio is at least 2:1. In other words the proper buoyant force is only half the magnitude of the vertical sections sinking force, and since the main chain ballast 141a is located at the bottom 110b of the vertical section 110 and creates the majority of the sinking force due to its massive nature compared to the fabrics, the vertical section 110 is upwardly stretched with buoyant tension and maintained in the upright perpendicular position 13 without lifting the bottom surface 120b of the horizontal section 120 from the underwater floor 20, as seen in FIGS. 2, 3a and 4. It is a main object of the present invention to most easily deploy the NFO Fence Boom 100 to the underwater floor 20 and to maintain the impermeable seal 21, thus a sinking force to proper buoyant force ratio for determining a volume of the prefabricated buoys could be higher than 2:1 such as 3:1 or 4:1, doing so allows for quicker deployment and a respective increase in sealing strength against the underwater floor 20. It should noted that increasing the sinking force to proper buoyant force ratio should not go as far as to prevent the vertical section 110 from being maintained in the upright perpendicular position 13 at the installation depth 38, which would oppose the main object of the present invention. The prefabricated buoys 131 are most preferably incompressible spheres of small diameter so as to aid in the storage of the NFO Fence Boom on a spool 31, however other buoys may be used which are either long flexible incompressible tubes or short incompressible buoys known in the art that could easily wrap around said spool 31. Furthermore, a wire, cable or rope could be coupled to the buoys 131, inside the pockets 130a-d.

The leading section 122 along with the two chain ballast pockets 140a-b are designed to sink the NFO Fence Boom 100 to the underwater floor 20 and thus create an impermeable seal 21. The leading section 122 can also comprise stiffeners 115 which act as an aid in deploying the NFO Fence Boom 100 into the water 35 and neatly onto the underwater floor 20 to expedite the formation of the NFO Fence Booms impermeable seal 21. The impermeable seal 21 is designed differently than any inventions on the market. The seal 21 is formed by the main chain ballast pocket 140a containing a main ballast chain 141a, and the second chain ballast pocket 140b containing a second chain ballast 141b wherein the chain ballast pockets and an entire bottom surface 120b of the horizontal section 120 abut the underwater floor 20. Wherein the chain ballast pockets 140a-b and chain ballasts 141a-b are linkable between each NFO Fence Boom section 100a-f by means that include but are not limited to carabineers, eyelets, rope, hook and loop fasteners, bolts, cable, heat welds or anything commonly used in the art.

Furthermore each NFO Fence Boom 100 has overlapping sections 103 located at the linking sides 110c-d and 122c-d of the vertical section 110 and leading section 122 respectively. Additionally tail edge 121 comprises overlapping sections 103 at each linking side 121c-d. These overlapping sections 103 comprise linking means such as grommets 104 which can be thread together with rope, zip ties or the like as is commonly done in the art. Overlapping sections could also be composed primarily of hook and loop fasteners, zippers, clamps, snaps, adhesives or heat welded plastics as are commonly used in the art.

Referring now to FIG. 3a, the NFO Fence Boom 100 is shown in an upright perpendicular position 13. This is shown by the vertical section 110 being suspended by the buoyant section 130 at a perpendicular arrangement with respect to the horizontal section 120. The NFO Fence Boom 100 comprises a strap 150 which is adjustable in nature, such as a nylon webbing strap or chain with a carabineer. The strap 150 can be used for multiple reasons, one is to aid the vertical section 110 from falling over when the oil 22 comes into contact with the NFO Fence Boom 100, further more strap 150 can have anchor holes 142 in which an additional chain with anchor or stake 42 could be attached to thus providing a further support means to hold and contain the heavy oils 22.

Furthermore, it is desired for the leading section 122 to extend from the joint 102 a distance equal to the height of the vertical section 110, thus creating an equally substaintial dual plane NFO Fence Boom. IF the leading section 122 is too short compared to the height of the vertical section 110, the chances of the seal 21 to be broken are increased, thus it I essential to the present invention that at least the leading section 122 of the horizontal section 120 extends a distance at least half the height of the vertical section 110 and more preferably equal to the height of the vertical section 110.

Figure 3B:
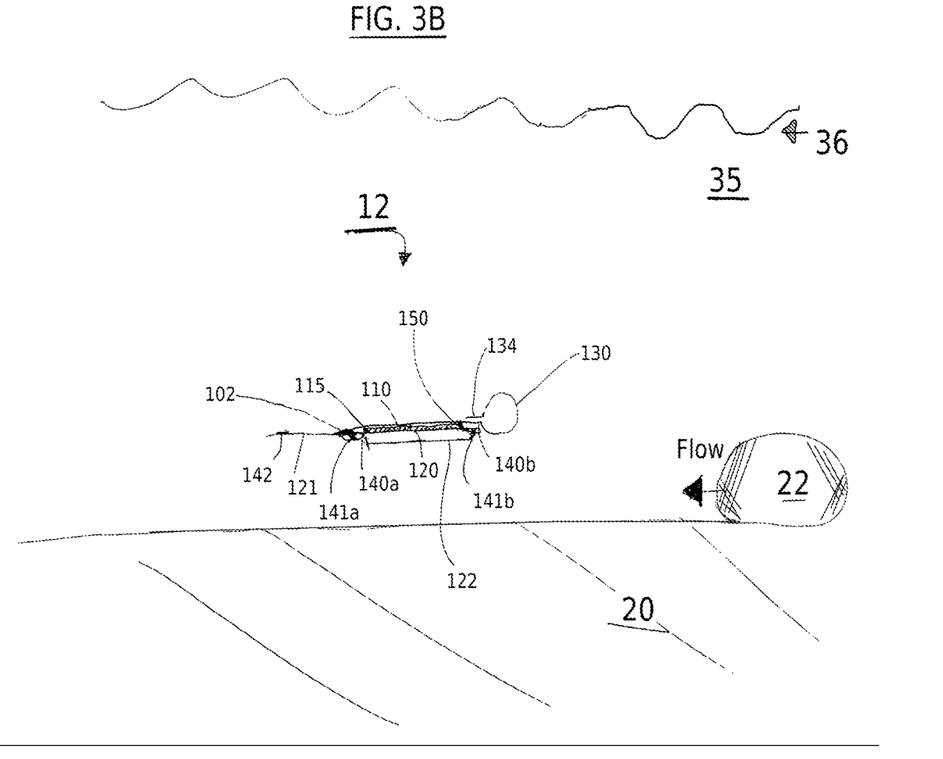
FIG. 3b shows a side view of the NFO Fence Boom while in a folded deployment/retrieval position

Another use of strap 150 is shown in FIG. 3b wherein the strap 150 is shortened thus causing the vertical section 110 to lay down against the leading section 122 to allow easier deployment and retrieval. This configuration is generally referred to as a folded position 12. In one embodiment of the present invention the buoyant section 130 is inflatable/deflatable, and thus in the folded position 12 the buoyant section 130 is not inflated to promote an easier deployment of the NFO Fence Boom 100. This ensures an expedited proper seal 21 with the underwater floor 20 during diver and/or boat deployment . . .

During diver deployment, the buoyant section 130 should remain deflated until the entire bottom surface 120b of horizontal section 120 is abutting the underwater floor 20, said stakes 42 are placed into the underwater floor, and said strap 150 is extended to allow the vertical section 110 to be suspended in its upright perpendicular position 13. At this point a diver 33 can use his pneumatic hose 34 to inflate the buoyant section 130 to provide the optimal buoyant force that maintains the vertical section 110 in its upright perpendicular position 13 without allowing the horizontal section 120 or chain ballast sections 140a-b from rising off the underwater floor 20, thus the impenetrable seal 21 is effectively maintained.

Referring to FIG. 4 the heavy sunken oils 22 are contained by the NFO Fence Boom 100 in its upright perpendicular position 13. The seal 21 is formed via the chain ballast 141a-b and the entire bottom surface 120b of the horizontal section 120. The seal 21 is further strengthened by the sunken oils 22 as the oils cover the leading section 122 by applying pressure to a top side 120a of horizontal section 120 thus preventing the leading edge 122a from lifting and breaking the seal 21. As can also be seen rocks or debris 43 are used to secure the tail edge 121 from moving or lifting. Furthermore it is shown that there is substantial room 38 above the buoyant section 130 for water currents to pass above the NFO Fence Boom 100 and thus not move or sway the horizontal section 120 from its seal 21.

Referring back to FIG. 2, the stiffeners 115 provide support between the main chain ballast pocket 140a and the second chain ballast pocket 140b, thus forcing the chain ballasts 141a-b to maintain a horizontal separation distance 47 and not become entwined with one another. Furthermore, the stiffeners 115 create a stronger seal 21 with the underwater floor 20 by maintaining a horizontal surface area 122' which opposes a top surface 122b of leading section 122 as it abuts the underwater floor 20. This horizontal surface area 122' has a frictional seal with the underwater floor 20 and is maximized when the entire surface area 122' is expanded from the main chain ballast pocket 140a to the leading edge 122a and completely abuts the underwater floor 20.

Furthermore the main chain ballast 141a can be a larger gauge chain and/or a more dense chain than the second chain ballast 141b. These chains for example could be ¼, ⅜, ½, ⅝, ¾ and/or 1 inch gauge chain, other sizes of chain or cable can also be used. The stakes 42 can be any suitable anchoring system well known in the art for varying underwater floor conditions, which include but are not limited to metal stakes, wood stakes, wide drag anchors, heavy weighted anchors, rocks, and/or chains or rope used to connect said stake 42 to the stakeholes 142. It should be further noted that the nonfloating oil 22 could be comprised of dilbit, group V oils, sinking oils, fuel oils, asphalt or the like.

Additionally, the stakeholes 142 are also shown in the drawings as 142a and 142b to show different useful positions along the NFO Fence Boom 100. The amount of stakeholes 142, 142a-b can vary depending on the location to be installed. In the pictured embodiment, the stakeholes 142, 142a, 142b are multipurpose and are used to bind the top end 110a of the vertical section 110 to the leading edge 122a as shown in FIG. 3b, an generally disclosed as the folded position 12 as well as to attach stakes 42 to the vertical section 110 via chain or nylon, or rope as is commonly done in the art. Furthermore the stakeholes 142a-b can be sewn or heat welded metal D rings that easily accept nylon webbing 150 or carabineers with chains attached thereto, this embodiment allows multiple support chains to be used to hold the vertical section 110 against the heavy oils 22 mass, or very rapid currents without compromising the impermeability of fabrics used. These stakeholes 142a,b can be placed at additional points along the NFO Fence Boom 100 such as at the top end 110a, bottom end 110b, or linking ends 110c-d of vertical section 110 and/or at or near the overlapping sections 103 of the vertical section 110 or horizontal section 120.

The above embodiments are used purely to describe the inventive concept and are not to be construed as a fully limiting disclosure. The main object of this invention is to overcome the following shortcomings of the prior art: the inability to maintain an impermeable seal with the underwater floor; the movement of fence booms due to tidal flow, river currents, wind currents, underwater currents, animal migration or the like; and the difficulties of sinking buoyed fences to the underwater floor.

The main object of the present invention, as shown in FIG. 4 is to provide a NFO Fence boom 100 that creates and maintains an impermeable seal 21 with an underwater floor 20 to stop migrating heavy oils 22 at a depth 37 beneath the body of waters surface 36 which is easily deployable by boat 30 and/or diver 33 that is less subject to water currents 39 due to the depth 38 of the buoyant section 130 while in an upright perpendicular position 13. The NFO Fence Boom 100 maintains said impermeable seal 21 in an innovative step using a combination of a horizontal section 120 having a main chain ballast 141a, a leading edge 122a, a vertical section 110 impermeably sealed at a joint 102 to a main chain ballast pocket 140a of the horizontal section 120, a buoyant section 130 that is adjustably inflated by either an inflatable air inlet 34 or by use of prefabricated buoys 131 of different diameters inserted through slit 32 to provide a proper buoyant force to maintain the vertical section 110 in an upright perpendicular position 13 without lifting the chain ballast 141a horizontal section 120 or leading edge 122a from the underwater floor 20. It is essential that the buoyant section 130 is maintained at a depth 38 beneath the surface 36 thus allowing optimal unrestricted flow of uncontaminated water above the fence thus minimizing the current flow 39 against the NFO Fence Boom.

Another main object of the present invention is to provide an additional second chain ballast 141b to increase sealing ability. In such usage the NFO Fence Boom 100 maintains said impermeable seal 21 in an innovative step using the combination of a horizontal section 120 having a main chain ballast 141a and a second chain ballast 141b, a vertical section 110 impermeably sealed at a joint 102 to a main chain ballast pocket 140a of the horizontal section 120, a buoyant section 130 that is adjustably inflated by either an inflatable air inlet 34 or by use of prefabricated buoys 131 of different diameters inserted through slit 32 to provide a proper buoyant force to maintain the vertical section 110 in an upright perpendicular position 13 without lifting the chain ballasts 141a-b or horizontal section 120 from the underwater floor 20. It is essential that the buoyant section 130 is maintained at a depth 38 beneath the surface 36 thus allowing optimal unrestricted flow of uncontaminated water above the fence.

The NFO Fence Boom 100 is easily deployed due to the main chain ballast 141a and second chain ballast 141b being designed to supply a sinking force that is greater than the buoyant force of the buoyant section 130, both being adjustable for any water depth 38 or water density. In addition a plurality of stiffeners 115 can be disposed along the horizontal section 120 to aid in expedited deployment of longer sections 100a-f by preventing the chain ballasts 141a-b from getting tangled together. The buoyant section 130 can be deflated during deployment to expedite the sinking and installation. The buoyant section 130 can be filled by inflation means that are common in the art. It is one preferred embodiment that maximizes construction to use a single piece of fabric folded and heat welded to form the buoyant section 130, the vertical section 110, the horizontal section 120 and each chain ballast pocket 140a-b. It is another preferred embodiment wherein a single piece of fabric is folded and heat welded to from the buoyant section 130, the vertical section 110 the leading section 122 and the second chain ballast pocket 140b, wherein the tail edge 121 and main chain ballast pocket 140a are formed of a different single sheet of fabric and one heat seal joint 102 is used to close the main chain ballast pocket 140a and impermeably seal the tail edge 121 to the vertical section 110 and leading section 122.

In certain depths 38, there may be the need for only the main chain ballast 141a and not the second chain ballast 141b, in these cases the leading edge 122a is staked 42 or buried 43 in a similar fashion as the tail edge 121. In these cases the main chain ballast 141a has enough sinking force to maintain the horizontal section 120 against the underwater floor 20, while the buoyant section 130 is supplied with a proper buoyancy to keep the vertical section 110 in the upright perpendicular position 13 while not lifting the main chain ballast 141a off the underwater floor 20 thus maintaining seal 21 to contain or redirect oils 22. The stiffening members 115 can be used in the same fashion, wherein a strap 150 binds a top end 110a of the vertical section to the leading edge 122a in a folded position 12 during deployment and thus the buoyant section 130 and main chain ballast 141a do not become entangled allowing easier installation.

Furthermore, during deployment each NFO Fence Boom section 100 can be placed in a pattern that better suits the installation location than a linked fence, such patterns can be V shaped, chevron patterns, stepped alignments, or aligned one behind another to catch large baths of or fast flowing sunken oils 22. In other cases the NFO Fence Boom 100 can have multiple sections linked for each portion of the pattern to ensure a long enough seal to contain said oils 22, such as 2-3 sections linked per side of a V, or per step.

It is another object of the present invention to supply a method for which to use the NFO Fence Boom 100 to enable ease of installation, and maximize the seal 21. The method comprising deploying a NFO Fence Boom 100; the NFO Fence Boom 100 comprising a buoyant section 130, a horizontal section 120, a vertical section 110, a main chain ballast pocket 140a, a main chain ballast 141a; sinking the NFO Fence Boom 100 to an underwater floor 20 until the main chain ballast 141a and horizontal section 120 are abutting the underwater floor 20; staking 42,43 the horizontal section 120 to the underwater floor 20; inflating 131, 134 the buoyant section 130 until is supplies a proper buoyant force to maintain the vertical section 110 in an upright perpendicular position 13 while not lifting the main chain ballast 141a or horizontal section 120 from the underwater floor 20; thus providing an impermeable seal 21 to contain or redirect heavy or sunken oils 22. This method can include usage of straps 150, a boat 30, a diver 33, stiffeners 115.

The following list of claims are intended to protect the inventive concept in the most reasonable manner which encompasses the entire scope of the invention without departing from the inventive steps we took to provide the NFO Fence Boom disclosed by us and only us. The obvious variants from our disclosed designs are only overlooked to allow some brevity to the present specification and should be obvious for one of ordinary skill in the art after learning of our invention.

What we claim is:

1. A nonfloating oil fence boom comprising:
   a vertical section;
   a horizontal section;
   a buoyant section;
   a main chain ballast;
   wherein the horizontal section is impenetrably sealed at a joint to a bottom end of the vertical section;
   wherein the buoyant section maintains the vertical section in an upright perpendicular position relative to a top surface of the horizontal section and the top surface of the horizontal section has an opposing bottom surface which completely abuts an underwater floor;
   wherein the nonfloating oil fence boom has a sinking force and a proper buoyant force, and the ratio of sinking force to proper buoyant force is at least 2:1.

2. The nonfloating oil fence boom of claim 1, wherein the main chain ballast is contained in a main chain ballast pocket located at the joint of the vertical and horizontal section.

3. The nonfloating oil fence boom of claim 2, wherein the horizontal section comprises a leading section that extends from the main chain ballast pocket to a leading edge, wherein a second chain ballast pocket is located at the leading edge and contains a second chain ballast.

4. The nonfloating oil fence boom of claim 2, wherein the buoyant section is specifically inflated to maintain a depth beneath a surface of a body of water, while not lifting the opposing bottom surface off the underwater floor.

5. The nonfloating oil fence boom of claim 2, wherein the horizontal section is comprised of a leading section that extends from the joint a separation distance which ends at a leading edge, and a tail edge that extends from the joint away from the leading section, wherein both the leading edge and tail edge comprise stakeholes.

6. The nonfloating oil fence boom of claim 5, wherein the opposing bottom surface of the horizontal section is the entire surface area of the horizontal section at least from the main chain ballast pocket to the leading edge, wherein the entire opposing bottom surface is abutting the underwater floor.

7. The nonfloating oil fence boom of claim 1, wherein the buoyant section provides a proper buoyant force to maintain the buoyant section a depth beneath a surface of a body of water, the depth being substantial enough to allow unrestricted water current flow above the buoyant section, and the proper buoyant force maintains the vertical section in said upright perpendicular position relative to the top surface while not lifting the opposing bottom surface off the underwater floor.

8. The nonfloating oil fence boom of claim 1, wherein the buoyant section has multiple buoy pockets, the buoy pockets are deflatable and inflatable via an air intake valve to create a proper buoyant force.

9. A method for using a nonfloating oil fence boom comprising:
   deploying a nonfloating oil fence boom;
      the nonfloating oil fence boom comprising a vertical section, a horizontal section, a buoyant section, a main chain ballast, wherein the horizontal section is impenetrably sealed at a joint to a bottom end of the vertical section;
      wherein the nonfloating oil fence boom has a sinking force and a proper buoyant force, and the ratio of sinking force to proper buoyant force is at least 2:1;
   sinking the Nonfloating Oil Fence Boom until a bottom surface of the horizontal section abuts an underwater floor;
   inflating the buoyant section to a proper buoyancy until it maintains the vertical section in an upright perpendicular position relative to a top surface of the horizontal section and does not lift the bottom surface from abutting the underwater floor.

* * * * *